Patented Feb. 17, 1925.

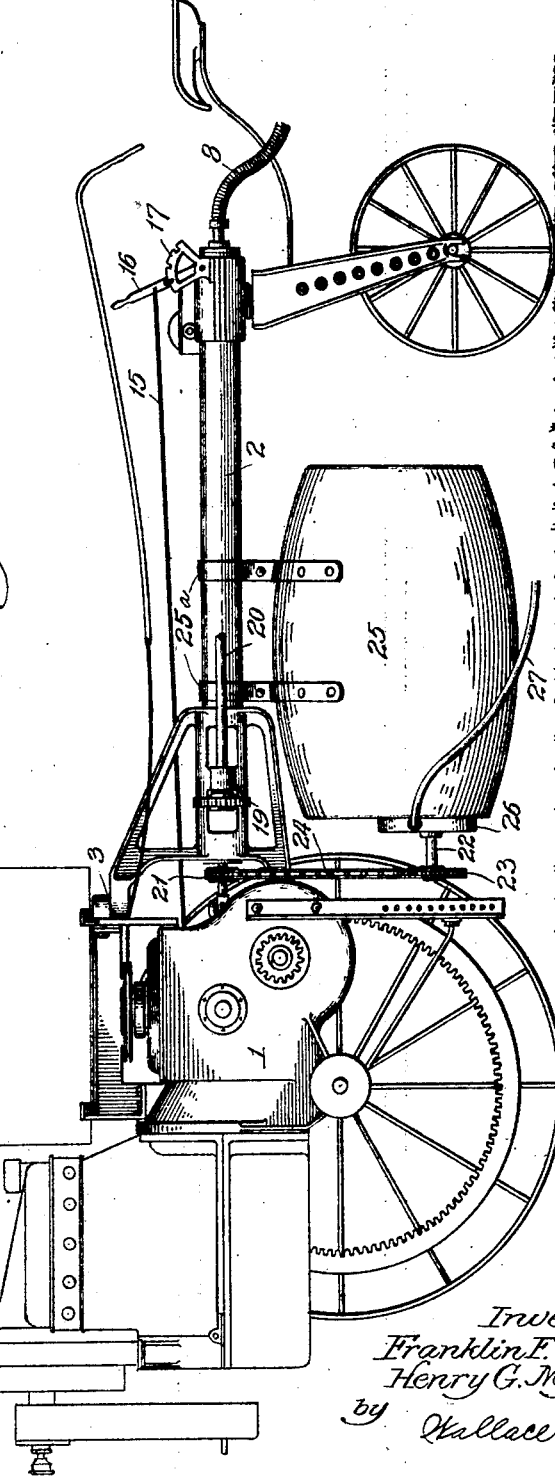

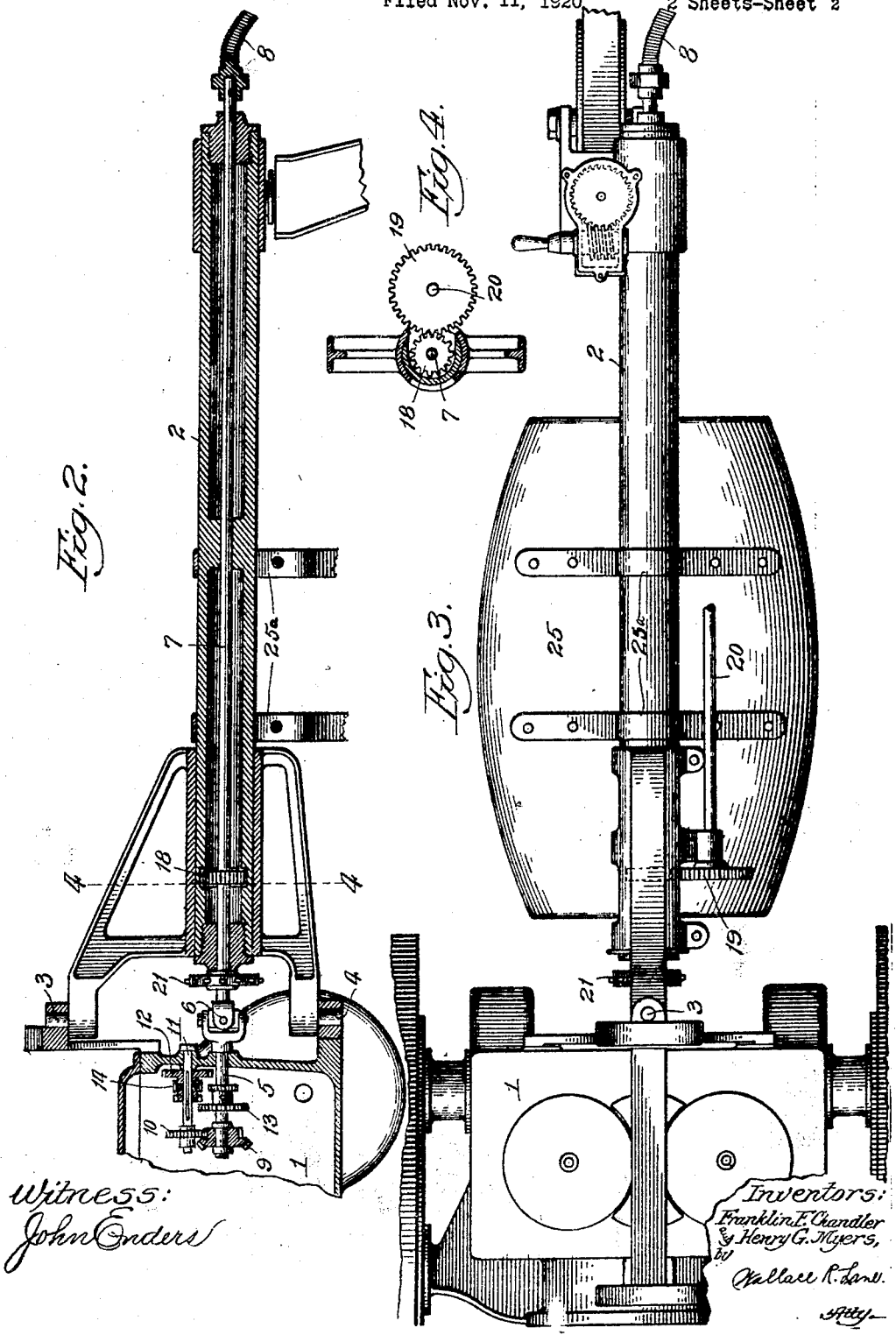

1,526,460

UNITED STATES PATENT OFFICE.

FRANKLIN F. CHANDLER AND HENRY G. MYERS, OF INDIANAPOLIS, INDIANA, ASSIGNORS TO ADAPTABLE TRACTOR COMPANY, OF INDIANAPOLIS, INDIANA, A CORPORATION OF INDIANA.

POWER-SHAFT EXTENSION MECHANISM.

Application filed November 11, 1920. Serial No. 423,269.

*To all whom it may concern:*

Be it known that we, FRANKLIN F. CHANDLER and HENRY G. MYERS, citizens of the United States, residing at Indianapolis, county of Marion, and State of Indiana, have invented certain new and useful Improvements in Power-Shaft Extension Mechanism, of which the following is a specification.

This invention relates to various means for transmitting power from a power shaft to mechanisms by which the power is to be utilized and comprises flexible means for transmitting power from the source thereof through a swinging beam to a place where the power may be used, auxiliary means for transmitting power alongside the swinging beam, means supported on the swinging beam to move therewith and swing thereon, means to transmit power from a power shaft to means supported on a swinging beam and adapted to operate said supported means, and includes such further objects advantages and capabilities as will later more fully appear.

Our invention further resides in the combination, construction and arrangement of parts illustrated in the accompanying drawings and while we have shown therein a preferred embodiment we desire the same to be understood as illustrative only and not as limiting our invention.

In the accompanying drawings, Fig. 1 is a side elevation of a tractor embodying our improvements.

Fig. 2 is a fragmentary longitudinal vertical section of the structure shown in Fig. 1.

Fig. 3 is a fragmentary plan view of Fig. 1.

Fig. 4 is a section substantially along the plane indicated by the line 4—4 Fig. 2.

Referring more in detail to the drawings numeral 1 indicates the traveling power unit, and 2 the swinging tail-beam of a tractor embodying our improvements. The tail-beam is connected to the power unit for lateral swinging by a pair of pivotal connections 3 and 4 shown more clearly in Fig. 2. The traveling power unit comprises a customary engine, radiator, traction wheels and driving connections between the engine and traction wheels. Rotatably supported in the tail beam is a shaft 7 extending through a longitudinal perforation in the tail-beam 2. At its rearward end shaft 7 has a removable connection with a flexible power transmitting member 8, which may be utilized to operate various mechanisms, through suitable driving means. Any available driving elements such as pulleys, gears, sprockets, cams, and the like may be substituted for the flexible driving element 8 for the transmission of power from the power unit.

Loosely mounted upon the forward end of shaft 5 is a gear wheel 9 adapted to mesh with a bevel gear operated by the engine and its connected mechanism and also adapted to mesh with and drive a pinion 10 on shaft 11 mounted in the power unit 1. Splined or otherwise slidably secured to the shaft 11 is a change speed gear 12 adapted to co-operate in an obvious manner with a similar gear 13 mounted on and secured to shaft 5. A suitable mechanism 14 is provided for moving the gear 12 from the operator's seat adjacent the rear end of the tail-beam 2. This mechanism includes rod 15, connected to and actuated by lever 16, having a portion adapted to engage notches or projections on the segment 17. It will be understood that in one position of lever 16 gears 12 and 13 will be out of engagement as shown in Fig. 2, while in another position of this lever the gears will be shifted into such positions as to drive the shaft 7 slowly and in third position, to drive the shaft 7 rapidly. It is believed this construction and operation will be sufficiently clear without further description thereof, it being understood that the change speed mechanism shown and described is merely illustrative, and is used to represent any desired device of this kind, which may be located either in connection with the power unit or with the tail-beam.

Within the tail-beam 2 and secured to the shaft 7 is a pinion 18 which is adapted to mesh with a pinion 19 carried by a shaft 20 externally of the tail-beam 2. It will be obvious that power can be transmitted either directly or indirectly from shaft 20 to mechanism in which the power is to be utilized.

Another auxiliary means for utilizing power transmitted to shaft 7 comprises the sprocket wheel or pulley 21, shaft 22, carrying sprocket-wheel or pulley 23, and chain or belt 24 connecting these two sprocket-wheels or pulleys. In the construction here shown a container 25 is suspended from the tail beam 2 by suitable means 25ª so connected to the tail beam that the container may oscillate about the axis of the tail beam 2, as is obvious from Fig. 1. In the construction shown a pump connected with the casing 26 is adapted to force a fluid from the interior of the container out through the casing and its connected pipe 27. It will be seen that, by reason of the construction here disclosed, shaft 22 will be maintained at a constant distance from the axis of tail-beam 2 regardless of any lateral oscillation of the container 25, and, therefore, that there will be no slack in chain or belt 24 and no unusual tension placed upon this element by reason of the relatively changed positions of members 2 and 25. Moreover, the parts are so arranged that when the tail beam 2 swings laterally with respect to the traveling power unit there is no tendency to twist the chain or belt 24, since the axes of the container 25, tail-beam 2, and shafts 7 and 22 are at all times maintained parallel. It is of course obvious that other things than the container 26 may be suspended from the tail beam 2, this being merely used by way of illustration. One great advantage of this method of suspension is that swinging of the suspended element about the tail beam does not get the parts out of easy operative relationship and another is that the suspended element may be removed and replaced any number of times without its resulting in the parts ever being out of proper relation. In this connection it might be noted that it may sometimes be desirable to support from the tail-beam devices which are not to be operated from the operating mechanism of the tractor and that any type of devices desired may be supported upon the casting connecting the tail-beam to the power unit or upon the casting or yoke at the rear end of the tail-beam.

It is of course understood that the specific description of structure set forth above may be departed from without departing from the spirit of our invention as set forth in this specification and the appended claims.

Having now described our invention, we claim—

1. In a tractor, a body, a driving shaft thereon, a tail beam pivoted on the body to swing in a substantially horizontal plane, a shaft extending through said beam and flexibly connected to the first named shaft, means adapted to be operated by rotation of said last named shaft, and supported by said beam and adapted to swing in an arc of a circle about the axis of the beam as a center.

2. In a tractor having a body and a tail-beam flexibly connected to the body for lateral swinging, driving mechanism including a driving shaft, a housing for said mechanism, said driving shaft rotatably supported in the housing, driven mechanism carried by the tail-beam, and driving connections between the shaft and driven mechanism and having co-axial axes whereby the driving connections between the same are maintained irrespective of the relative movements thereof.

3. In a tractor, a traveling power unit, a tail-beam pivoted thereto for lateral swinging, a container suspended from the tail-beam and capable of swinging thereabout in an arc of a circle, rotatable mechanism secured to the container, a shaft journalled within the tail-beam and swinging therewith, connections between the rotatable mechanism and the shaft whereby the former may be driven from the latter in any normal position of adjustment of the parts, and operative connections between the source of power and the shaft.

4. In a tractor, a traveling power unit, a tail-beam pivoted thereto for lateral swinging, a container suspended from the tail-beam, a rotary pump operating in connection with the container, a shaft journaled within the tail-beam and swinging therewith, a flexible driving connection between the rotary pump and the shaft whereby the former may be driven from the latter in any normal position of adjustment of the parts, and operative connections between the source of power and the shaft.

5. In a tractor, a power unit, a tail-beam pivoted thereto, a shaft journalled in the tail-beam and flexibly connected to the power unit, an operated mechanism suspended from the tail-beam and having an axis of rotation substantially parallel with the said shaft, and flexible connecting means for driving said operated mechanism from said shaft.

6. In a tractor, a power unit and a tail-beam, the tail-beam being flexibly connected to the power unit for lateral swinging, in combination with a device suspended from the tail-beam and adapted to oscillate about the axis thereof and operative connections between the power unit and suspended device.

In witness whereof, we hereunto subscribe our names to this specification in the presence of two witnesses.

FRANKLIN F. CHANDLER.
HENRY G. MYERS.

Witnesses:
NORMAN B. CHANDLER,
M. E. SLIDER.